United States Patent [19]

Starnes, Jr.

[11] Patent Number: 4,541,277

[45] Date of Patent: Sep. 17, 1985

[54] SELF-SEALING, SELF-CLEANING SIGHT GLASS

[75] Inventor: R. Emory Starnes, Jr., Carrollton, Ga.

[73] Assignee: Southwire Company, Carrollton, Ga.

[21] Appl. No.: 535,171

[22] Filed: Sep. 23, 1983

[51] Int. Cl.⁴ .................... G02B 7/00; G01F 23/02
[52] U.S. Cl. .................... 73/432 R; 73/324; 73/334; 350/584
[58] Field of Search ............ 73/324, 334, 432 G; 350/584; 220/82 R, 82 A; 422/119

[56] References Cited

U.S. PATENT DOCUMENTS

| | | | |
|---|---|---|---|
| 2,850,005 | 9/1958 | Good et al. | 350/584 |
| 3,402,418 | 9/1968 | Le Roy | 73/324 |
| 3,725,028 | 4/1973 | Cramer | 350/584 |
| 3,744,873 | 7/1973 | Jamison | 350/584 |

Primary Examiner—S. Clement Swisher
Attorney, Agent, or Firm—Herbert M. Hanegan

[57] ABSTRACT

A sight glass assembly (10), especially adapted for use with continuous vulcanizing lines and the like wherein visual or optical access is required, constructed so as to provide self-sealing action during assembly and continuously self-cleaning action during use. A chamber (19) having an exit flow aperture (25) adjacent the viewing element (14) is subjected to a pressurized fluid or gas flow, which is discharged across the inner face of the viewing element. The pressurized fluid or gas is supplied externally through a passageway communicating (16) with the chamber.

15 Claims, 4 Drawing Figures

SELF-SEALING, SELF-CLEANING SIGHT GLASS

TECHNICAL FIELD

This invention relates to the art of insulating electrical wires, and more particularly to an apparatus providing visual access to enable accurate measurement of wire diameter and/or insulation thickness of insulated cable passing through an enclosed vulcanizing atmosphere and a method of cleaning the inside surface of a sight glass. More particularly, the invention relates to a self-sealing and self-cleaning sight glass assembly for low pressure continuous vulcanizing steam tubes.

BACKGROUND ART

In the cable making art there are generally two types of insulation and/or jacket materials used in the fabrication of electrical wire and cable; i.e., thermosetting materials and thermoplastic materials. The application of thermoset materials as the insulation or jacket of an electrical wire or cable requires use of vulcanization (curing) apparatus to cause the thermosetting reaction to occur. The most widely accepted technique of manufacturing extruded vulcanized type cables is to pass the conductor through a series of extruder heads and apply concentrically the plastic compounds. After application of the plastic compounds, the cables are usually vulcanized (cured under pressure) in a saturated steam environment followed by cooling under pressure. In such a steam curing process, the insulated conductor is moved through the vulcanizer and exposed to pressurized (typically 250 psi) saturated steam followed by cooling under pressurized water (typically 250 psi). The thermosetting compound contains curing agents which are activated at the high temperatures found within the vulcanizer with the speed of the vulcanization reaction depending on the temperature within the vulcanizer (for 250 psi steam, approximately 210° C.).

The steam curing process has been used in horizontal, vertical, slant and catenary installations. Long length curing pipes have been demonstrated to be preferred by those practicing the art of steam curing cables; this is so because the polyethylene and ethylenepropylene rubber insulations commonly used characteristically have high thermal resistances and therefore heavily insulated cables of the type used for high voltage operation take a long time to cure. Alternatively, higher temperature and pressure inert gases may be used to cure the insulation, and may be coupled with a dry cooling process to cool the cured insulation.

Strict manufacturing tolerances require a minimum thickness of plastic, typically at least several thousandths of an inch. Manufacturing process and cost controls, however, dictate that maximum extra thickness be limited in order to facilitate production and reduce material costs. Visual and/or optical access to the moving wire is thus necessitated for measurement. However, the fragile and delicate uncured plastic cannot be touched, and it is contained within an elongated pressurized tube, filled with heated steam or pressurized inert gas.

Various styles of sight gauge glass configurations have been used by experts in the industry, all of which experience shows are either fragile, expensive, short-lived, and/or difficult to install and maintain. A particularly difficult problem associated with the prior art sight glasses used in vulcanizing lines is their predilection for becoming dirty and/or fogged on the inaccessible inside thereof, requiring shut down, disassembly and very costly cleaning. The present invention is directed to solving these and other problems associated with the prior art.

DISCLOSURE OF INVENTION

The present invention contemplates the incorporation of a specially adapted sight or gauge glass assembly for use in facilitating an elongated vertical visual or optical access to insulated wire moving through a cure tube in the vulcanizing portion of an insulating process line. While the apparatus is described for use in the foregoing specific situation, it should be kept in mind that the apparatus may be utilized in other, similar situations and that its use is not restricted.

In common use are steam and nitrogen vulcanizing lines. Both condensation and the by-products of the cross-linking or vulcanization process collect on the inside face of ordinary sight glasses and obstruct the view therethrough after only relatively short periods of operation, necessitating frequent cleaning for reliable use. The present invention comprises an elongated sight glass in sealing contact with an aperture in a plate which in turn is in sealing contact with a flange, wherein an aperture exists along at least a portion of the length of the sight glass at the side thereof for diffusion of a stream of fluid, vapor, or gas across the face of the sight glass, thus "wiping" the sight glass face and keeping same clear and clean. In the present preferred embodiment a pair of entry apertures are provided, one on each side of the sight glass along the length thereof with a narrow slit aperture opening at an angle across the shorter face of the sight glass so as to provide the wiping action by the fluid or gas. The present preferred embodiment is further characterized in that the fluid, vapor, or gas is discharged from both sides at an angle between 30° and 85° relative to the inside face of the sight glass, after passing through a narrow slit clearance of about 0.003 inches, following which a non-laminar flow is created across the face of the glass to provide an efficient scrubbing action. Multiple eddy currents are thus set up to further improve scrubbing efficiency.

It is therefore an object of this invention to provide a self-cleaning sight glass aperture for visual or optical access to cable within the pressurized gas, vapor, or liquid vulcanizing tube.

Another object of the invention is to eliminate frequent cleaning of the sight glass.

Still another object of the invention is to eliminate frequent breakage of the sight glass.

Yet another object of this invention is the substitution of less expensive, less fragile, more readily available materials which are easier to fabricate, assemble, and install.

And another object of this invention is the provision of a more effective pressure seal.

It is yet another object of the present invention to provide a method of cleaning the inside surface of a sight glass assembly.

And yet another object of this invention is to provide high velocity, high turbulence wiping across the inner face of the sight glass to ensure efficient cleaning thereof.

BRIEF DESCRIPTION OF THE DRAWINGS

Other features and advantages of the invention disclosed will be apparent upon examination of the drawing figures forming a part hereof, in which self-cleaning sight glass apparatus is shown.

BEST MODE FOR CARRYING OUT THE INVENTION

Figure 1:
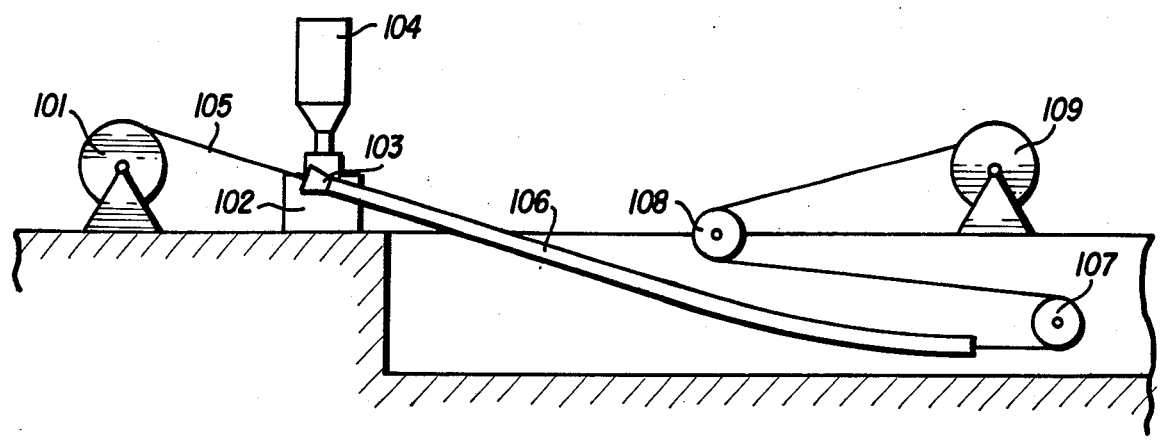
FIG. 1 shows, in quite simplified form, an overall view of one conventional continuous vulcanizing line.

The present invention comprises an optical or visual sight glass modification to a continuous vulcanizing curing tube and a method of cleaning the inside surface of the sight glass. FIG. 1 shows a prior art continuous vulcanization line 100 for wire or cable 105. Material is unwound from cable supply reel 101 and guided through an extruder head 103 forming a part of extruder 102. Plastic compound is fed from supply hopper 104 to the extruder 102 which applies the plastic to the wire 105. The covered wire is directed into a curing tube 106 disposed along a path along which the cable is continuously advanced, to capstan 107, thence to and around capstan 108 and to take up reel 109.

The present invention may be retrofitted or newly installed on apparatus such as that of FIG. 1, singly or in pairs at one or more locations along the length of curing tube 106, and for exemplary purposes herein will be described as a pair of sight glasses mounted on either side of a flanged pipe cross having both axes at or near horizontal and located at or near the beginning of the curing tube 106, as may be desired in order to facilitate measurement of the insulated cable diameter at the initiation of the vulcanization process.

Figure 2:
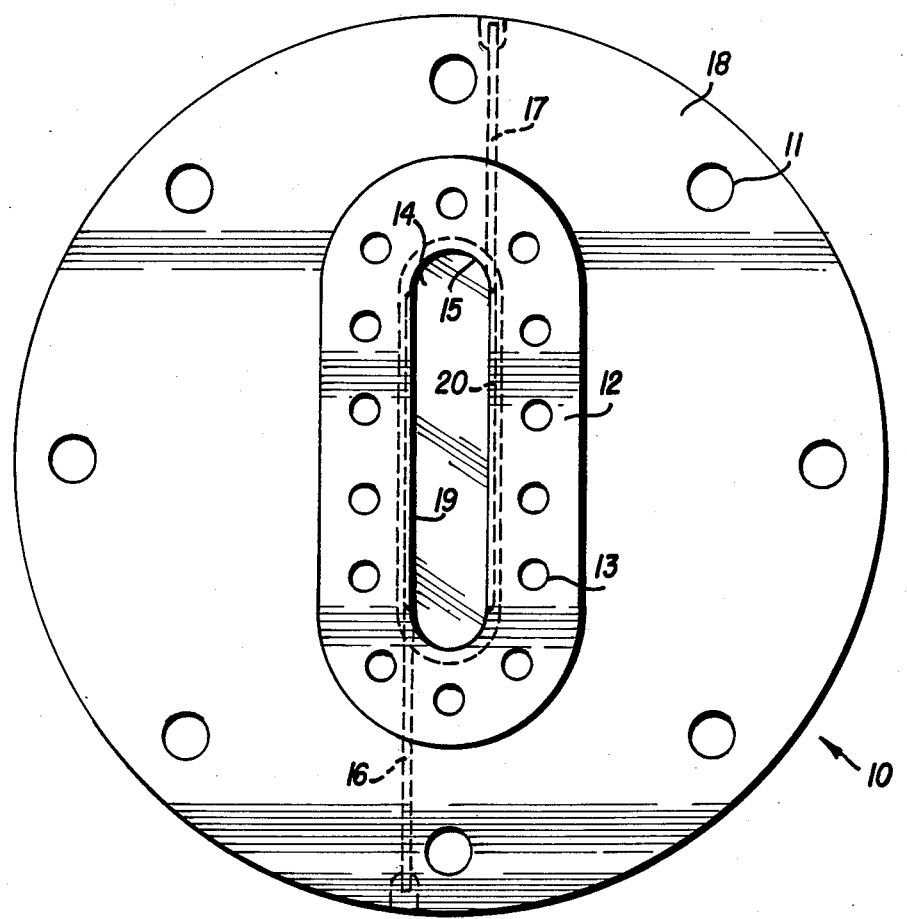
FIG. 2 shows a face view of the present invention, including certain hidden lines to show communicating apertures.

Sight glass assembly 10, an embodiment of the present invention, is shown in face view in FIG. 2. Included are a first, flat centrally apertured member means or mounting plate (first element) 18 for mounting to a flange, having a plurality of mounting holes 11 around the periphery thereof, as required, a second, flat, centrally apertured member means or sight glass cover (means for retaining the sight glass) 12, cover mounting holes 13, viewing glass element 14, a resilient sealing means or O-ring seal 15, and right and left chamber passageways 16 and 17, which communicate with right and left (first and second) chambers 19 and 20. Additional seals may be used as required.

Figure 3:
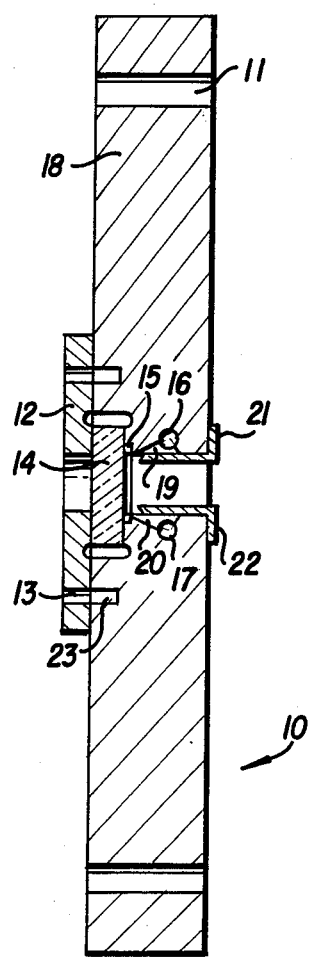
FIG. 3 shows a cross section view of the present invention, including certain hidden lines to show communicating apertures.

As shown in FIG. 3, the first member means 18 includes a face plane, and the aperture thereof comprises a first stepped face and a second stepped face lying on a plane recessed behind said first stepped face. The face plane has an outer recess for the sealing means and a second inner recess adjacent the aperture forming a lip therebetween.

The mounting plate 18 may be fabricated from an ordinary blind steel flange cover; cast steel flange covers are preferred due to the lower internal stress level as compared with forged material. Use of a modified cast flanged cross and ordinary steel flange covers modified for mounting the sight glass assembly is especially advantageous from supply, cost, and fabrication standpoints.

Turning to FIG. 3, there is shown a transverse section of the invention along the horizontal axis of the sight glass assembly 10, showing an exemplary arrangement of the elements of this invention. Flange plate 18 has a plurality of mounting holes 11 drilled about its periphery, and a central aperture for viewing and for mounting the viewing glass element 14 which is held in its recessed position by sight glass cover 12 secured with fasteners (not shown) inserted through a plurality of cover mounting holes 13 into threaded recesses 23 in the flange plate 18. An O-ring seal 15 provides the pressurized seal between the flange plate 18 and viewing glass element 14. At least one (a pair are shown here) communicating passage 16, 17 allows fluid, vapor, or gas to be supplied into the sealed atmosphere, where the passages communicate with one or more communicating passageways or chambers 19, 20 along the edge of the viewing glass 14. The chambers 19, 20 are formed by covering recesses with right and left chamber covers 21, 22, which will be described in further detail hereinafter. In this case, the chambers are disposed along the lengthwise edge of the viewing apertures in the flange plate 18 and sight glass cover 12, and are so constructed as to direct a continuous flow of the fluid, vapor, or gas across the inner face of the viewing glass 14.

O-ring 15 is compressed between an O-ring lip on flange plate 18 and viewing glass element 14 by the sight glass cover fasteners, not shown, which are tightened to seat the viewing glass element against a relieved "land" area of the viewing glass recess. In the particular example shown here, the land area lies only slightly further below the face of flange cover 18 than the thickness of the viewing glass element, thereby permitting an efficient seal between the viewing glass 14 and the flange plate 18 when the sight glass cover fasteners (not shown) are properly tightened. Internal pressure forces "O" ring 15 into the small remaining area between sight glass 14 and land on plate 18, thereby creating a self-sealing action.

Figure 4:
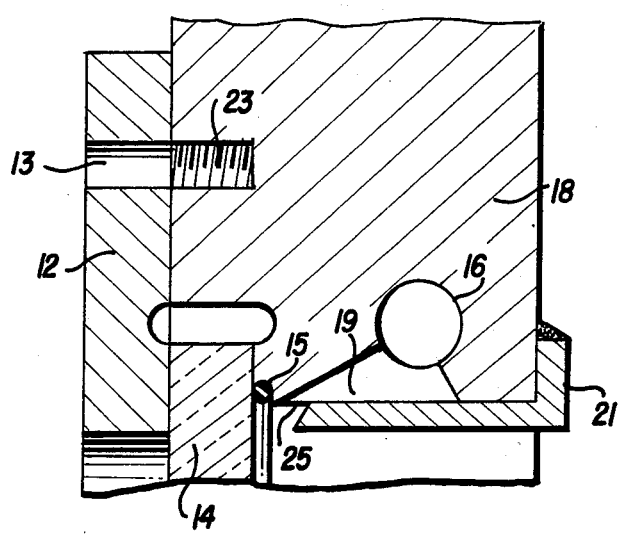
FIG. 4 shows an enlarged cross section view of the present invention in greater detail.

Turning now to both FIGS. 3 and 4, wherein FIG. 4 shows an enlarged view of the device as shown in FIG. 3, there is additionally and more clearly shown in FIG. 4 the narrow gap 25 at the corner of the chamber 19.

The chamber may be formed with a conventional cutting tool in a milling machine by cutting at an angle through the central aperture, here being cut substantially the full length of the longitudinal axis of the aperture. In the event that an alternatively shaped view glass element (i.e., round or square) is desired, the chamber may be cut around the inner periphery of the central aperture in a similar manner. Closure of the chamber is achieved with a chamber cover 21 positioned so as to provide the desired gap 25 dimension, then fixed in place as by welding on the reverse (inside) side of flange plate 18. In practice, it has been determined that positioning is most readily accomplished by inserting a shim having a thickness equal to the desired air gap 25 between the chamber cover and the wall of the chamber groove, clamping the chamber cover 21, in position, and welding the cover in place.

By providing the above described apparatus, the elongated sight glass may be cleaned by introducing a fluid through the passages so that they discharge from the passages at an angle between 30° and 85° relative to the sight glass and passing the fluid across the inside surface of the sight glass so as to clean the inside surface of the sight glass.

What is claimed is:

1. A self-sealing, self-cleaning sight glass assembly for permitting visual access to a closed chamber, comprising:
   a. a first apertured member means for mounting to a flange on the chamber,
   b. an elongated viewing glass means for covering said aperture,
   c. sealing means for releasably sealing said viewing glass means and said first member means, positioned between said viewing glass means and said first member means,
   d. a second member means for releasably securing said viewing glass means to said first member means,
   e. in said first member at least two exhaust apertures extending along an elongated portion of the viewing glass means for facilitating the passage of a fluid or gas transversely across at least a portion of the inside surface of the viewing glass means, said apertures being opposite one another,
   f. an entry aperture for fluid, vapor, or gas extending through said first member means, and
   g. at least one communicating passageway between said entry aperture and said exhaust apertures.

2. The self-sealing, self-cleaning sight glass assembly of claim 1, wherein the first member means includes a face plane and the aperture thereof comprises a first stepped face and a second stepped face lying on a plane recessed behind said first stepped face, wherein the second face and first face are separated by a distance which is slightly less than the cross section of the sealing means, and the first face and front face are separated by a distance slightly greater than the thickness of the viewing glass means.

3. In the self-sealing, self-cleaning sight glass assembly of claim 1, further characterized in that said first member means includes a face plane having a central aperture therethrough, said face plane having an outer recess for the sealing means and being of a depth less than the cross section diameter of the sealing means, and a second inner recess adjacent the aperture forming a lip therebetween, and a fluid inlet having a communicating passageway to the second, inner recess, wherein the lip between the second, inner recess and the central aperture is recessed slightly below the face plane of said first member means.

4. Apparatus as in claim 1, wherein the exhaust aperture discharges a fluid, vapor, or gas at an angle of 30 to 85 degrees relative to the inside face of the viewing element.

5. Apparatus as in claim 3, wherein the exhaust aperture discharges a fluid, vapor, or gas in a non-laminar flow pattern.

6. A self-cleaning sight glass assembly for permitting visual access to a closed chamber interior, comprising:
   a first element connected to said chamber and having an aperture therein;
   elongated sight glass means of the first element covering the aperture for viewing the chamber interior, a surface of the sight glass means facing the chamber interior;
   exhaust means arranged adjacent said aperture on opposite sides thereof for directing the passage of a fluid across the interior facing surface of the sight glass means to clean said interior facing surface of the sight glass means; and
   passage means connected to the exhaust means for delivering fluid to the exhaust means.

7. The sight glass assembly according to claim 6, further comprising means for retaining the sight glass means over the aperture in a sealing manner.

8. The sight glass assembly according to claim 7, wherein the passage means extends through the first element.

9. The sight glass assembly according to claim 8, further comprising a first chamber recessed within said first element and extending along a first elongated side of the periphery of the aperture adjacent the interior facing surface of the sight glass means, said first chamber being connected to the passage means.

10. The sight glass assembly according to claim 9, further comprising a second chamber recessed within said first element and extending along a second elongated side of the periphery of the aperture adjacent the interior facing surface of the sight glass means, said second side being on the opposite side of the aperture from the first side and said second chamber being connected to a second passage means for delivering fluid to the second chamber.

11. The sight glass assembly according to claim 10, further comprising means for directing the fluid across the interior facing surface of the sight glass means at an angle of 30 to 85 degrees.

12. The sight glass assembly according to claim 11, wherein said directing means comprises a chamber cover attached to said first element for partially covering the first chamber.

13. A method of cleaning the inside surface of an elongated sight glass in a sight glass assembly mounted to a chamber, comprising the steps of:
   providing a means for mounting the sight glass to the chamber and a first passage for permitting the passage of a fluid across the inside surface of the sight glass through an elongated gap and a second passge opposite the first passage for permittng the passage of a fluid across the inside surface of the sight glass through a second elongated gap;
   introducing a fluid through the passages so that they are discharged from said passages at an angle between 30° and 85° relative to the sight glass; and
   passing the fluid across the inside surface of the sight glass so as to clean said inside surface of the sight glass.

14. The method according to claim 13, further including the steps of discharging the fluid so that multiple eddy currents are established as the fluid passes over the sight glass.

15. The method according to claim 14, wherein the fluid is discharged in a non-laminar flow pattern.

* * * * *